United States Patent
Han (10) Patent No.: US 7,102,976 B2
(45) Date of Patent: Sep. 5, 2006

(54) APPARATUS AND METHOD FOR GENERATING WRITE PULSE FOR OPTICAL STORAGE MEDIUM USING RING OSCILLATOR

(75) Inventor: Myung-hee Han, Yongin-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 625 days.

(21) Appl. No.: 10/352,893

(22) Filed: Jan. 29, 2003

(65) Prior Publication Data

US 2003/0156520 A1   Aug. 21, 2003

(30) Foreign Application Priority Data

Jan. 29, 2002   (KR) ............... 10-2002-0005214

(51) Int. Cl.
*G11B 7/0045*   (2006.01)

(52) U.S. Cl. ............... 369/59.11; 369/47.28; 369/59.2

(58) Field of Classification Search ......... 369/59.11, 369/59.2, 47.28
See application file for complete search history.

(56) References Cited

U.S. PATENT DOCUMENTS

| 6,009,534 A | * | 12/1999 | Chiu et al. ............... 713/503 |
| 6,438,081 B1 | * | 8/2002 | Jinbo et al. ............ 369/47.28 |
| 6,445,661 B1 | * | 9/2002 | Wu ........................ 369/59.2 |
| 6,721,255 B1 | * | 4/2004 | Gushima et al. ........ 369/59.12 |

FOREIGN PATENT DOCUMENTS

JP   6-334491 A   12/1994

* cited by examiner

*Primary Examiner*—Andrea Wellington
*Assistant Examiner*—Nathan Danielsen
(74) *Attorney, Agent, or Firm*—Sughrue Mion, PLLC (57) ABSTRACT

An apparatus and a method for generating a write pulse to be written on an optical storage medium using a ring oscillator are provided. The apparatus includes a ring oscillator outputting n tap signals, and a pulse generation unit converting a channel clock signal to have as long a cycle as an interval among the n tap signals, and generating a write pulse following the converted channel clock signal.

10 Claims, 5 Drawing Sheets

APPARATUS AND METHOD FOR GENERATING WRITE PULSE FOR OPTICAL STORAGE MEDIUM USING RING OSCILLATOR

BACKGROUND OF THE INVENTION

1. Field of the Invention

The present invention relates to an apparatus for generating a write pulse for an optical storage medium, and more particularly, to an apparatus for generating a digital write pulse using a ring oscillator.

This patent application is based on Korean Patent Application No. 2002-5214, the contents of which is incorporated herein by reference.

2. Description of the Related Art

There are various kinds of related art optical storage media, such as a 4.7 GB DVD-RAM, a 2.7 GB DVD-RAM, a DVD-RW, a DVD-R, and a CD-R. Write pulses are recorded on different parts of an optical storage medium depending on the type of optical storage medium, and can be represented by a resolution of, for example, one fortieth, one thirty fourth, or one thirtieth of a channel clock. Channel clock frequencies, which affect write pulses, may vary depending on the optical storage medium and its recording or reproducing speed. In general, an optical storage medium has a channel clock frequency of 4–120 MHz.

Figure 1:
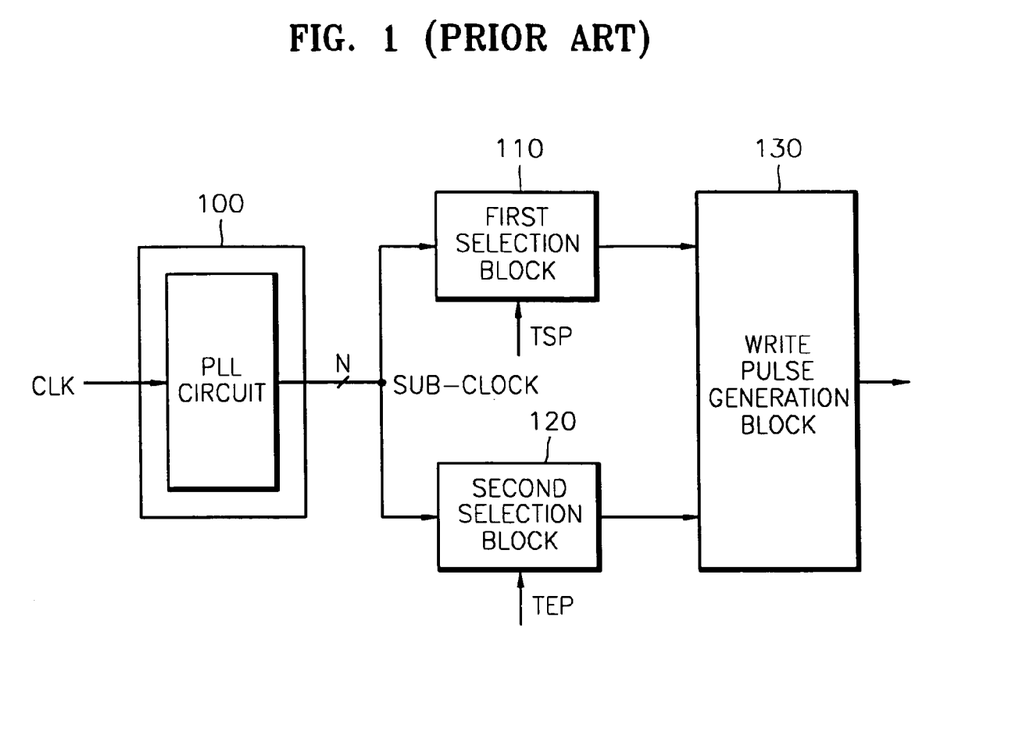
FIG. 1 is a block diagram of a related art apparatus for generating a write pulse for an optical storage medium.

FIG. 1 is a block diagram of a related art apparatus for generating a write pulse for an optical storage medium, including a phase locked loop (PLL) circuit 100, a first selection block 110, a second selection block 120, and a write pulse generation block 130. The PLL circuit 100 converts a channel clock input CLK into N subclocks having a predetermined phase difference. The PLL circuit 100 may be embodied in an analog or digital manner, or may be replaced by a delay locked loop (DLL) circuit.

The first selection block 110 and the second selection block 120 each select one of the N subclocks output from the PLL circuits 100. At this time, the first selection block 110 is controlled so that it can select a value TSP indicating a start point of a pulse, and the second selection block 120 is controlled so that it can select a value TEP indicating an end point of the pulse. The write pulse generation block 130 generates a write pulse having a start point and an end point determined based on pulses, generated by the first and second selection blocks 110 and 120.

The aforementioned related art has various problems and disadvantages. For example, but not by way of limitation, although the related art apparatus for generating a write pulse for an optical storage medium has such a simple structure, it is necessary to increase the number of subclocks generated by the PLL circuit 100 to satisfy the high operational frequency bandwidth of an optical storage medium and enhance the resolution of a write pulse. As a result, great effort and time are required to develop a PLL circuit having a high resolution. When the related art PLL circuit adopts an analog manner, an interface circuit used for the PLL circuit to interface with digital equipment is also needed.

Accordingly, it is necessary to develop an apparatus for generating a write pulse for a digital optical storage medium, which requires less time and effort to develop and has a simple structure that can replace a PLL circuit when the PLL circuit malfunctions.

SUMMARY OF THE INVENTION

The present invention provides an apparatus for generating a write pulse for an optical storage medium, capable of generating a write pulse having a high resolution by using a ring oscillator, instead of a PLL circuit in an optical storage medium.

According to an aspect of the present invention, there is provided an apparatus for generating a write pulse for an optical storage medium, using a ring oscillator. The apparatus includes a ring oscillator outputting n tap signals, and a pulse generation unit converting a channel clock to have as long a cycle as an interval among the n tap signals and generating a write pulse based on the converted channel clock.

Preferably, the pulse generation unit includes a tap controller converting a signal to be written on the optical storage medium and a channel clock into a write signal having as long a cycle as an interval among the n tap signals and a channel clock having as long a cycle as the interval among the n tap signals, respectively, and outputting the write signal and the channel clock, a selector selecting two tap signals among the n tap signals output from the ring oscillator as a write start signal and a write end signal, based on the write signal output from the tap controller, and outputting the tap signals, and a pulse generator generating a write pulse connecting the write start signal and the write end signal by using the tap signals output from the selector and the result of comparing the write signal and the channel clock, which are output from the tap controller.

Preferably, the tap controller includes a tap counter counting the n tap signals generated by the ring oscillator, a synchronization detector determining a tap signal having a most similar shape as a rising edge of the channel clock, among the n tap signals generated by the ring oscillator, a signal selector outputting a count value of the tap signal determined by the synchronization detector by referring to the results of counting the n tap signals performed in the tap counter, a latch unit memorizing a sequence number of a tap signal having a most similar shape to a rising edge of a previous clock and outputting the tap signal at a current moment of time, and a tap converter converting a current clock signal into a clock signal having as long a cycle as an interval among the n tap signals, as shown in the following equation: $CLK_{tap}=2 \times n \times tapcnt \times$(interval between previous clock tap signal and current clock tap signal), the tap converter calculating tap count values of a start signal and an end signal of a signal to be written in the current clock, and converting the tap count values into signals having as long a cycle as an interval among the n tap signals.

Preferably, the selector generates a start clock control signal and an end clock control signal in consideration of the number of tap intervals of a start pulse of the signal to be written, which is output from the tap controller, and the number of tap intervals of an end pulse of the signal to be written.

Preferably, the pulse generator includes a window signal generator generating a start pulse window signal and an end pulse window signal, which are set to '1', if tap count values of a start write pulse and an end write pulse generated by the tap controller turn out to be the same as a tap count value of a channel clock, and are set to '0', if the tap count values of the start write pulse and the end write pulse are not the same as the tap count value of the channel clock, a start pulse and end pulse generator defining positions of a start pulse and an end pulse based on the start pulse window signal and the end pulse window signal generated by the window signal generator under the control of the tap signals output from the selector, and a write pulse generation gate generating a write pulse connecting the start pulse and the end pulse.

To achieve another aspect of the present invention, there is provided an apparatus for generating a write pulse to be written on an optical storage medium, using a ring oscillator. The apparatus includes a ring oscillator outputting n tap signals, a tap controller converting a signal to be written on the optical storage medium and a channel clock into a write signal having as long a cycle as an interval among the n tap signals and a channel clock having as long a cycle as the interval among the n tap signals, respectively, and outputting the write signal and the channel clock, a selector selecting two tap signals among the n tap signals output from the ring oscillator as a write start signal and a write end signal, based on the write signal output from the tap controller, and outputting the tap signals, and a pulse generator generating a write pulse connecting the write start signal and the write end signal by using the tap signals output from the selector and the result of comparing the write signal and the channel clock, which are output from the tap controller.

Preferably, the tap controller includes a tap counter counting the n tap signals generated by the ring oscillator, a synchronization detector determining a tap signal having a most similar shape as a rising edge of the channel clock, among the n tap signals generated by the ring oscillator, a signal selector outputting a count value of the tap signal determined by the synchronization detector by referring to the results of counting the n tap signals performed in the tap counter, a latch unit memorizing a sequence number of a tap signal having a most similar shape to a rising edge of a previous clock and outputting the tap signal at a current moment of time, and a tap converter converting a current clock signal into a clock signal having as long a cycle as an interval among the n tap signals, as shown in the following equation: $CLK_{tap}=2 \times n \times tapcnt \times$(interval between previous clock tap signal and current clock tap signal), calculating tap count values of a start signal and an end signal of a signal to be written in the current clock, and converting the tap count values into signals having as long a cycle as an interval among the n tap signals.

Preferably, the selector generates a start clock control signal and an end clock control signal in consideration of the number of tap intervals of a start pulse of the signal to be written, which is output from the tap controller, and the number of tap intervals of an end pulse of the signal to be written.

Preferably, the pulse generator includes a window signal generator generating a start pulse window signal and an end pulse window signal, which are set to '1', if tap count values of a start write pulse and an end write pulse generated by the tap controller turn out to be the same as a tap count value of a channel clock, and are set to '0', if the tap count values of the start write pulse and the end write pulse are not the same as the tap count value of the channel clock, a start pulse and end pulse generator defining positions of a start pulse and an end pulse based on the start pulse window signal and the end pulse window signal generated by the window signal generator under the control of the tap signals output from the selector, and a write pulse generation gate generating a write pulse connecting the start pulse and the end pulse.

To achieve still another aspect of the present invention, there is provided a method of generating a write pulse to be written on an optical storage medium. The method includes generating n tap signals having a predetermined phase difference, searching the n tap signals for a tap signal, which is synchronized with a current channel clock, and calculating a tap count value and a tap interval of the tap signal in the current channel clock, calculating tap count values and tap intervals of a start signal and an end signal of a signal to be written, defining positions of a write start point and a write end point controlled at every tap interval by using a tap count value and a tap interval of the channel clock and a tap count value and a tap interval of the signal to be written, and generating a write pulse connecting the write start point and the write end point.

Preferably, defining the locations of the write start point and the write end point includes generating a start window signal and an end window signal, which are set to '1' and '0', respectively, if tap count values of a start signal and an end signal of the signal to be written turn out to be the same as a tap count of a channel clock, and outputting the result of toggling the start window signal by using to the tap signal selected based on the tap interval of the start signal of the signal to be written and the result of toggling the end window signal by using the tap signal selected based on the tap interval of the end signal of the signal to be written.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 2:
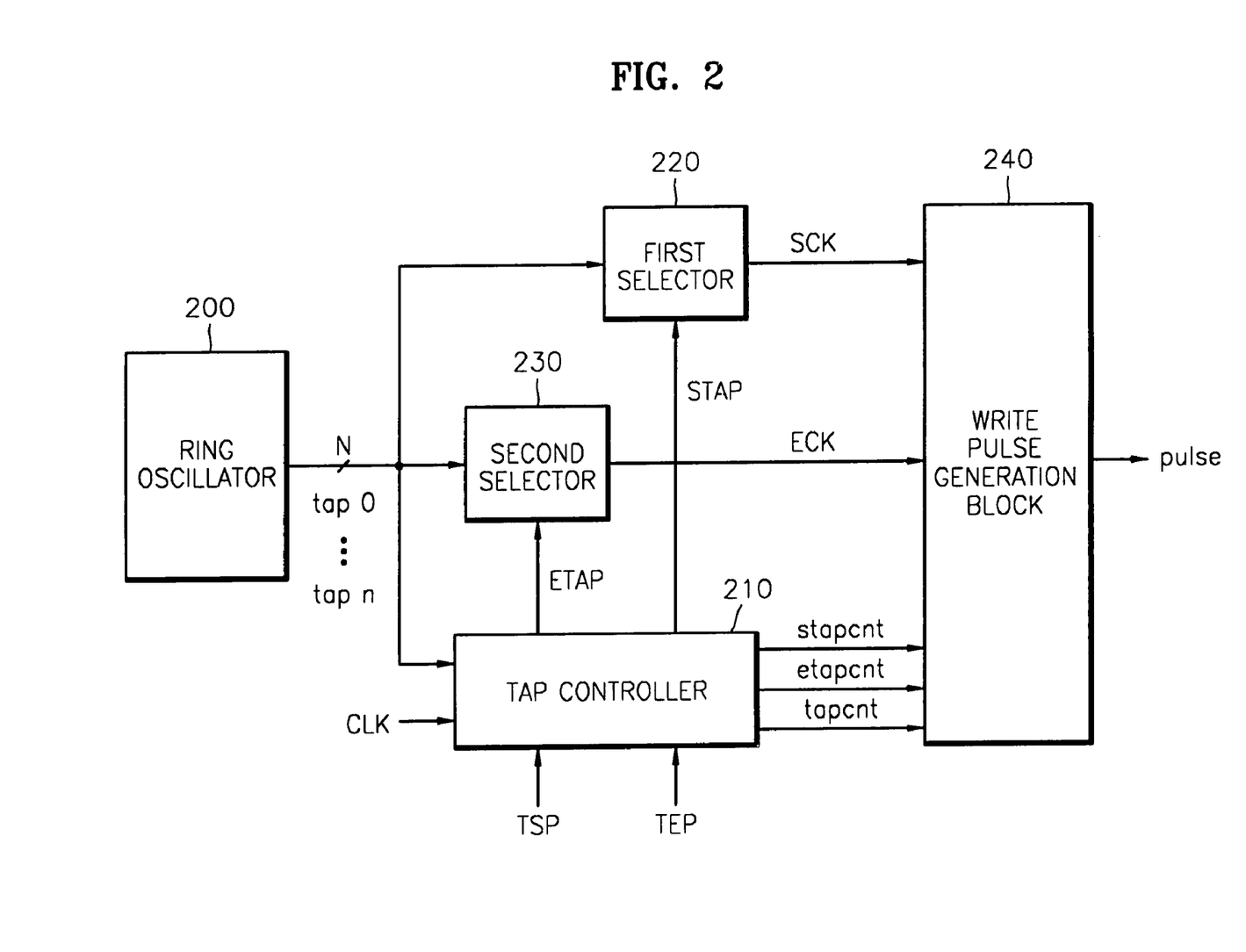
FIG. 2 is a block diagram of an apparatus for generating a write pulse for an optical storage medium using a ring oscillator according to a preferred embodiment of the present invention.

Hereinafter, the present invention will be described more fully with reference to the accompanying drawings. FIG. 2 is a block diagram of an apparatus for generating a write pulse for an optical storage medium using a ring oscillator according to a preferred embodiment of the present invention. The apparatus includes a ring oscillator 200, a tap controller 210, a first selector 220, a second selector 230, and a write pulse generation block 240.

The ring oscillator 200 generates and outputs n tap signals, which are used to convert a location of a specific signal into a count value. The n tap signals preferably have a substantially similar interval between themselves.

The tap controller 210 converts a channel clock signal CLK into a tap unit, which is an interval between tap signals (i.e., tap interval unit) by using the n tap signals generated by the ring oscillator 200. The channel clock signal CLK may vary depending on the optical storage medium and its speed. The controller 210 also converts a start pulse TSP and an end pulse TEP of a signal to be written into tap unit.

The first and second selectors 220, 230 generate a start clock control signal SCK and an end clock control signal ECK, respectively, according to the number STAP of tap intervals of the start pulse TSP and the number ETAP of tap intervals of the end pulse TEP, respectively. The write pulse generator 240 generates a write pulse signal ranging from a start signal to an end signal of the tap unit. The start and end signals are generated by the tap controller 210 according to a tap unit clock signal, also generated by the tap controller 210.

Figure 3:
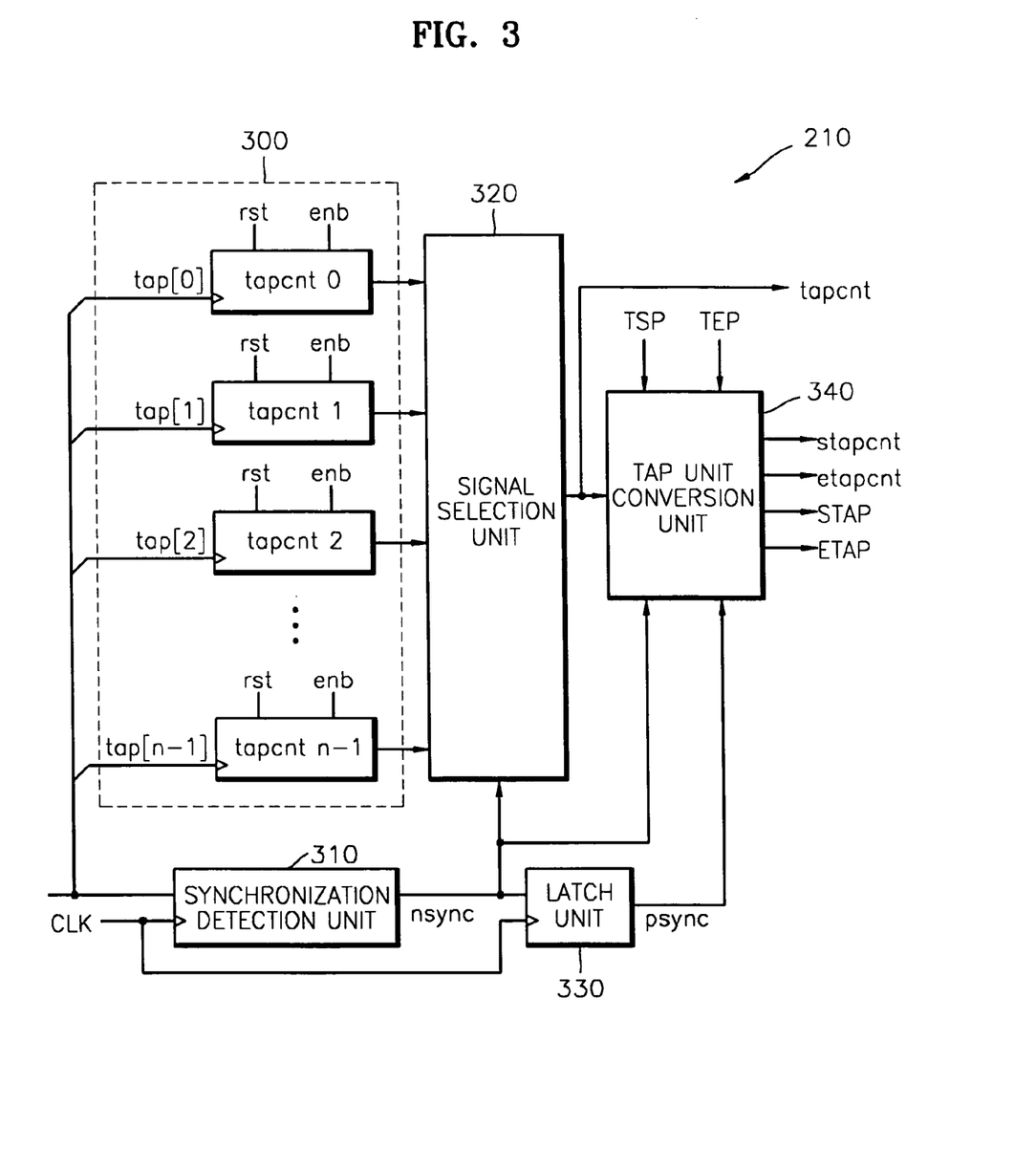
FIG. 3 is a block diagram of a tap controller shown in FIG. 2 according to a preferred embodiment of the present invention.

FIG. 3 is a block diagram of an example of the tap controller 210 shown in FIG. 2, including a tap counter unit 300, a synchronization detection unit 310, a signal selection unit 320, a latch unit 330, and a tap unit conversion unit 340. The tap counter unit 300 includes n tap counters that count respective n tap signals tap[0] through tap[n−1], which are generated by the ring oscillator 200. Each of the n tap counters starts to perform counting in response to an enabling signal 'enb' and stops performing counting in response to a resetting signal 'rst'.

The synchronization detection unit 310 searches, among the n tap signals tap[0] through tap[n−1], for a tap signal 'nsync' having a same or substantially similar shape to the rising edge of a channel clock signal CLK. The tap signal 'nsync' output from the synchronization detection unit 310 becomes a sequence number of a tap signal.

The signal selection unit 320 selects a tap counter corresponding to the tap number (i.e., the tap signal 'nsync' searched for by the synchronization detection unit 310) from among the n counters, and outputs a count value 'tapcnt' of the tap counter.

When a current channel clock signal is input at a current time (t), the latch unit 330 keeps a tap number 'nsync' for a channel clock signal input at a previous time (t−1). The latch unit 330 then outputs a tap number 'psync' of the current channel clock signal at the time (t) when the current channel clock signal is input. In other words, the latch unit 330 memorizes a sequence number of a tap signal having a most similar shape to a rising edge of a previous channel clock signal, and outputs the sequence number of that tap signal at the current time (t).

The tap unit conversion unit 340 obtains the count value 'tapcnt' output from the signal selection unit 320, as well as a difference between the tap numbers 'psync' and 'nsync' (i.e., difference between the sequence numbers of the tap signal selected by the signal selection unit 320 for (a) the previous channel clock signal and (b) the current channel clock signal). When one cycle of a tap signal corresponds to a tap count value 'tapcnt', as many as 2×n tap intervals are generated in one tap count value 'tapcnt'. Intervals among tap signals correspond to differences among sequence numbers of the tap signals. Accordingly, the result of converting one channel clock signal CLK into tap intervals can be obtained as shown in Equation (1) below.

$$CLK_{tap}=2\times n\times \text{tapcnt} \times (\text{interval between previous clock tap signal and current clock tap signal}) \quad (1)$$

Thereafter, the tap unit conversion unit 340 calculates tap count values 'stapcnt' and 'etapcnt' in one channel clock signal CLK of each of the start and end pulses TSP and TEP of the signal to be written. The tap unit conversion unit 340 outputs values STAP and ETAP, which are generated by converting the tap count values 'stapcnt' and 'etapcnt' into the tap interval unit.

Figure 4:
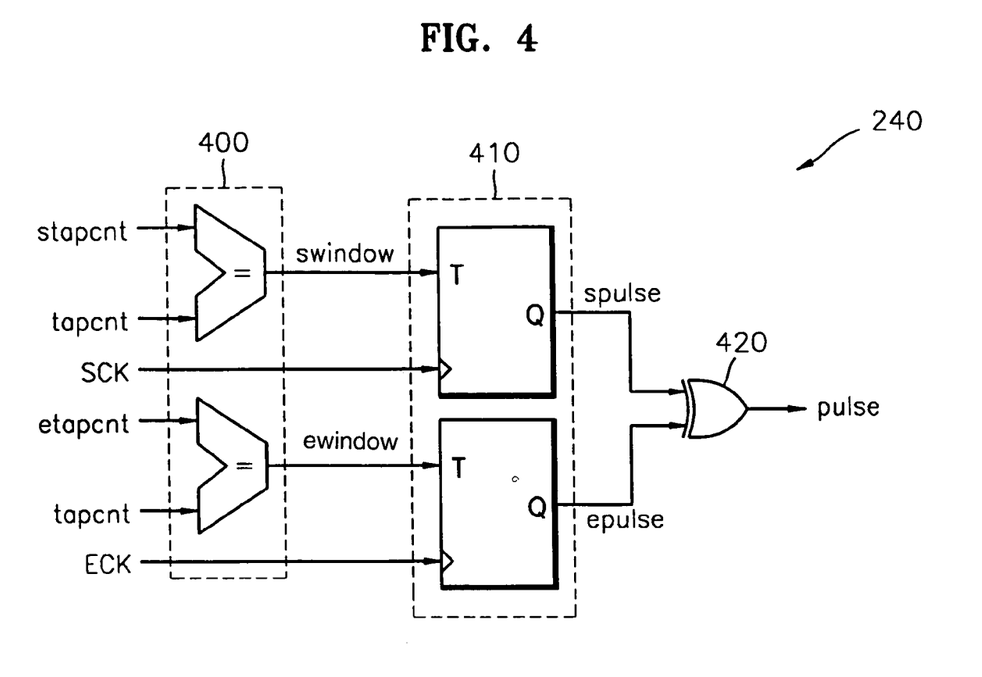
FIG. 4 is a block diagram of a write pulse generation block shown in FIG. 2.

FIG. 4 is a block diagram of an example of the write pulse generation block 240 shown in FIG. 2, including a window signal generator 400, a start pulse and end pulse generator 410, and a write pulse generation gate 420.

The window signal generator 400 compares the tap count value 'tapcnt' of a channel clock signal with the tap count value 'stapcnt' of a start write pulse generated by the tap controller 230 of FIG. 3. The window signal generator 400 also compares 'tapcnt' with the tap count value 'etapcnt' of an end write pulse generated by the tap controller 230. As a result of that comparison, if the tap count value 'tapcnt' equals the tap count values 'stapcnt' and 'etapcnt', the window signal generator 400 generates a start pulse window signal 'swindow' and an end pulse window signal 'ewindow', which are set to '1'. On the other hand, if the tap count value 'tapcnt' does not equal the tap count values 'stapcnt' and 'etapcnt', the window signal generator 400 generates 'swindow' and 'ewindow', which are set to '0'.

The start pulse and end pulse generator 410 receives 'swindow' and 'ewindow' from the window signal generator 400 and defines a start pulse 'spulse' and an end pulse 'epulse' using the control signals SCK and ECK output from the first and second selectors 220 and 230, respectively, as control signals. The results of toggling the levels of 'swindow' and 'ewindow' in response to the control signals SCK and ECK using a T-type flip-flop, which receives 'swindow' and 'ewindow' and uses the control signals SCK and ECK as clock signals, are output as the start and end pulses 'spulse' and 'epulse'.

The write pulse generation gate 420 generates a write pulse connecting 'spulse' and 'epulse' as defined by the start pulse and end pulse generator 410. For example, but not by way of limitation, in FIG. 4, a write pulse 'pulse' is obtained using a NAND gate, which receives 'spulse' and 'epulse'.

Figure 5:
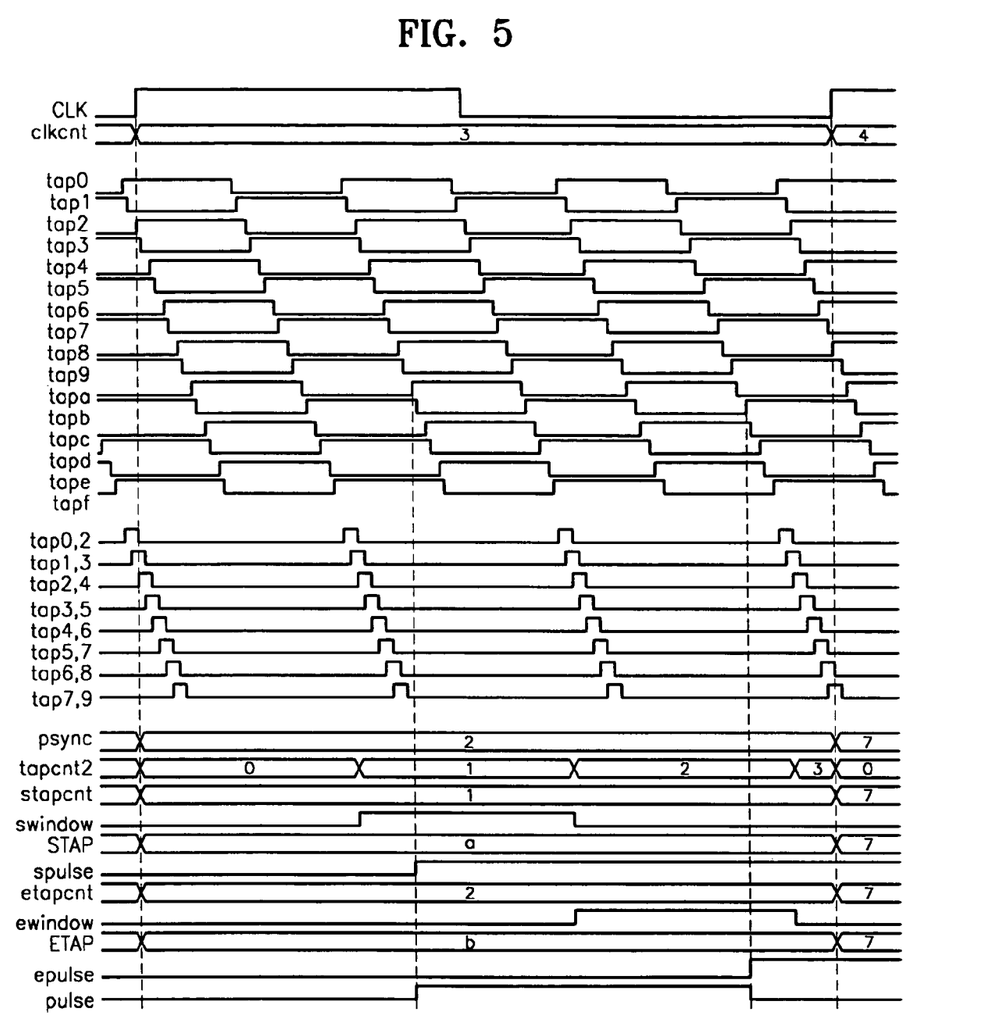
FIG. 5 is a diagram illustrating waveforms of signals generated from each part of an apparatus for generating a write pulse using a ring oscillator according to a preferred embodiment.

FIG. 5 is a diagram showing the waveforms of signals output from each part of an apparatus for generating a write pulse using a ring oscillator according to a preferred embodiment of the present invention, based on operation of the apparatus shown in FIGS. 2 through 4. N tap signals (here, n =16) tap0 . . . tapf output from the ring oscillator 200 have a predetermined phase difference. Also, 32 (i.e., 2×n where n=16) pulses are generated in one cycle of a clock based on the n tap signals tap0 . . . tapf.

The tap controller 210 searches for a tap signal having a most similar shape to a rising edge of a current channel clock signal CLK among the n tap signals tap0 . . . tapf, and outputs the tap signal as a tap signal 'nsync'. In FIG. 5, the tap signal 'nsync' is the second tap signal tap2. Thereafter, a signal indicating that the tap signal 'nsync' is the second tap signal tap2 is output, and a count value of the second tap signal tap2 is output according to the tap signal 'nsync'. In FIG. 5, tapcnt2 indicates the count value of the second tap signal tap2.

The tap counter values 'stapcnt' and 'etapcnt' of the start and end pulses of a signal to be written that has been stored in an external register are calculated. Then, the number STAP of tap intervals of 'stapcnt' and the number ETAP of tap intervals of 'etapcnt' are calculated.

As a result of comparing 'tapcnt' with 'stapcnt' and 'etapcnt', the window signals 'swindow' and 'ewindow' are generated. If 'stapcnt' or 'etapcnt' is the same as 'tapcnt', 'swindow' or 'ewindow' is set to '1'. On the other hand, if 'stapcnt' or 'etapcnt' is not the same as 'tapcnt', 'swindow' or 'ewindow' is set to '0'.

The start pulse 'spulse' and the end pulse 'epulse' are defined by a T-type flip-flop, which has the start and end clock control signals SCK and ECK as its clock signals, and the window signals 'swindow' and 'ewindow' as its input signals. The start and end clock control signals SCK and ECK are obtained from the first and second selectors 220 and 230, respectively. Tap signals 'tapa' and 'tapb' are selected in response to STAP having a value of 'a' and ETAP having a value of 'b', respectively.

After 'spulse' and 'epulse' are determined, the write pulse 'pulse' is generated. The write pulse 'pulse' starts from a rising edge of 'spulse' and ends with a rising edge of 'epulse'. In FIG. 5, tap0,2 through tap7,9 represent enabling signals enb for the counters of the tap counter unit 211 in the tap controller 210.

The present invention has various advantages. For example, but not by way of limitation, as described above, according to the present invention, it is possible to realize an apparatus for generating a write pulse as a digital circuit by generating a write pulse for an optical storage medium using a ring oscillator. Thus, there is no need to additionally provide an analog-digital interface circuit, which was necessary with the related art analog PLL circuit instead of the ring oscillator of the present invention.

Further, since in the present invention, a ring oscillator replaces a PLL circuit, the time and effort taken to develop such a related art PLL circuit can be reduced. In addition, the apparatus for generating a write pulse according to the present invention operates irrespective of input frequencies, because it uses a ring oscillator. Therefore, it is possible to generate a write pulse, which can be recorded on any kinds of optical storage media, using the apparatus for generating a write pulse according to the present invention.

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

What is claimed is:

1. An apparatus for generating a write pulse for an optical storage medium, comprising:
   a ring oscillator outputting n tap signals; and
   a pulse generation unit converting a channel clock signal to have a cycle as long as an interval among the n tap signals, and generating a write pulse based on the converted channel clock signal,
   wherein the pulse generation unit comprises:
   a tap controller converting a signal to be written on the optical storage medium into a write signal having a cycle as long as an interval among the n tap signals, and converting the channel clock signal into a channel clock signal having a cycle as long as the interval among the n tap signals, and outputting the write signal and the channel clock signal;
   a selector selecting two tap signals among the n tap signals as a write start signal and a write end signal, based on the write signal output from the tap controller, and outputting the two tap signals; and
   a pulse generator generating a write pulse connecting the write start signal and the write end signal by using the tap signals output from the selector and the result of comparing the write signal and the channel clock signal output from the tap controller.

2. The apparatus of claim 1, wherein the tap controller comprises:
   a tap counter counting the n tap signals generated by the ring oscillator;
   a synchronization detector determining a tap signal among the n tap signals that has a most similar shape to a rising edge of the channel clock signal;
   a signal selector outputting a count value of the tap signal determined by the synchronization detector based on the results of the tap counter counting the n tap signals;
   a latch unit memorizing a sequence number of a tap signal having a most similar shape to a rising edge of a previous clock signal, and outputting the tap signal at a current time; and
   a tap converter converting a current clock signal into a clock signal having a cycle as long as an interval among the n tap signals, based on the following equation:

$CLK_{tap}=2 \times n \times tapcnt \times$(interval between previous clock tap signal and current clock tap signal), said tap converter calculating tap count values of a start signal and an end signal of a signal to be written in the cycle of the current clock signal, and converting the tap count values into signals having as long a cycle as an interval among the n tap signals.

3. The apparatus of claim 2, wherein the selector generates a start clock control signal and an end clock control signal based on the number of tap intervals of a start pulse of the signal to be written, and the number of tap intervals of an end pulse of the signal to be written, respectively.

4. The apparatus of claim 3, wherein the pulse generator compromises:
   a window signal generator generating a start pulse window signal and an end pulse window signal set to '1' if tap count values of a start write pulse band an end write pulse generated by the tap controller equal a tap count value of a channel clock signal, and set to '0' if the tap count values of the start write pulse and the end write pulse do not equal the tap count value of the channel clock signal;
   a start pulse and end pulse generator defining positions of a start pulse and an end pulse based on the start pulse window signal and the end pulse window signal generated by the window signal generator under the control of the tap signals output from the selector; and
   a write pulse generation gate generating a write pulse connecting the start pulse and the end pulse.

5. An apparatus for generating a write pulse to be written on an optical storage medium, comprising:
   a ring oscillator outputting n tap signals;
   a tap controller converting a signal to be written on the optical storage medium into a write signal having a cycle as long as an interval among the n tap signals, and converting a channel clock signal into a channel clock signal having a cycle as long as the interval among the n tap signals, and outputting the write signal and the channel clock signal;
   a selector selecting two tap signals among the n tap signals as a write start signal and a write end signal, based on the write signal output from the tap controller, and outputting the two tap signals; and
   a pulse generator generating a write pulse connecting the write start signal and the write end signal by using the tap signals output from the selector and the result of comparing the write signal and the channel clock signal, which are output from the tap controller.

6. The apparatus of claim 5, wherein the tap controller comprises:
   a tap counter counting the n tap signals generated by the ring oscillator;
   a synchronization detector determining a tap signal among the n tap signals that has a most similar shape to a rising edge of the channel clock signal;

a signal selector outputting a count value of the tap signal determined by the synchronization detector based on the results of the tap counter counting the n tap signals;

a latch unit memorizing a sequence number of a tap signal having a most similar shape to a rising edge of a previous clock signal, and outputting the tap signal at a current time; and a tap converter converting a current clock signal into a clock signal having a cycle as long as an interval among the n tap signals, based on the following equation:

$$CLK_{tap} = 2 \times n \times \text{tapcnt} \times (\text{interval between previous clock tap signal and current clock tap signal}),$$

said tap converter calculating tap count values of a start signal and an end signal of a signal to be written in the cycle of the current clock signal, and converting the tap count values into signals having as long a cycle as an interval among the n tap signals.

7. The apparatus of claim 6, wherein the selector generates a start clock control signal and an end clock control signal based on the number of tap intervals of a start pulse of the signal to be written and the number of tap intervals of an end pulse of the signal to be written, respectively.

8. The apparatus of claim 7, wherein the pulse generator comprises:

a window signal generator generating a start pulse window signal and an end pulse window signal set to '1' if tap count values of a start write pulse and an end write pulse generated by the tap controller equal a tap count value of a channel clock signal, and set to '0' if the tap count values of the start write pulse and the end write pulse do not equal the tap count value of the channel clock signal;

a start pulse and end pulse generator defining positions of a start pulse and an end pulse based on the start pulse window signal and the end pulse window signal generated by the window signal generator under the control of the tap signals output from the selector; and a write pulse generation gate generating a write pulse connecting the start pulse and the end pulse.

9. A method of generating a write pulse to be written on an optical storage medium, comprising:

generating n tap signals having a predetermined phase difference;

searching the n tap signals for a tap signal synchronized with a current channel clock signal, and calculating a tap count value and a tap interval of the tap signal in the current channel clock signal;

calculating tap count values and tap intervals of a start signal and an end signal of a signal to be written;

defining positions of a write start point and a write end point controlled at each of said tap intervals by using a tap count value and a tap interval of each of (a) the channel clock signal and (b) the signal to be written; and generating a write pulse connecting the write start point and the write end point.

10. The method of claim 9, wherein said defining comprises:

generating a start window signal and an end window signal set to '1' and '0', respectively, if tap count values of a start signal and an end signal of the signal to be written turn out to be the same as a tap count of a channel clock signal; and outputting the result of toggling the start window signal by using the tap signal selected based on the tap interval of the start signal and the result of toggling the end window signal by using the tap signal selected based on the tap interval of the end signal.

* * * * *